US012670546B2

(12) United States Patent
Kang et al.

(10) Patent No.: US 12,670,546 B2
(45) Date of Patent: Jun. 30, 2026

(54) APPARATUS AND METHOD WITH IMAGE RESOLUTION UPSCALING

(71) Applicant: SAMSUNG ELECTRONICS CO., LTD., Suwon-si (KR)

(72) Inventors: Nahyup Kang, Suwon-si (KR); Hanjun Kim, Suwon-si (KR); Jaeyoung Moon, Suwon-si (KR); Hyeonseung Yu, Suwon-si (KR); Juyoung Lee, Suwon-si (KR); Hwiryong Jung, Suwon-si (KR); Inwoo Ha, Suwon-si (KR); Seokpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/323,024

(22) Filed: May 24, 2023

(65) Prior Publication Data

US 2024/0169482 A1     May 23, 2024

(30) Foreign Application Priority Data

Nov. 22, 2022     (KR) .......................... 10-2022-0157630

(51) Int. Cl.
G06T 3/4046          (2024.01)
G06N 3/045           (2023.01)
                (Continued)

(52) U.S. Cl.
CPC ........... G06T 3/4046 (2013.01); G06N 3/045 (2023.01); G06N 3/08 (2013.01); G06T 3/18 (2024.01); G06T 3/4007 (2013.01)

(58) Field of Classification Search
CPC ....... G06T 3/4046; G06T 3/18; G06T 3/4007; G06T 3/4053; G06T 2207/20081;
                (Continued)

(56) References Cited

U.S. PATENT DOCUMENTS

| | | | |
|---|---|---|---|
| 11,367,165 B2 | 6/2022 | Xiao et al. | |
| 2011/0134999 A1* | 6/2011 | Han ....................... | H04N 19/63 375/240.18 |

(Continued)

FOREIGN PATENT DOCUMENTS

| | | |
|---|---|---|
| KR | 10-2019-0112384 A | 10/2019 |
| KR | 10-2019-0117416 A | 10/2019 |
| KR | 10-2021-0045828 A | 4/2021 |

OTHER PUBLICATIONS

Tong, Tong, et al. "Image super-resolution using dense skip connections." Proceedings of the IEEE international conference on computer vision. 2017. (Year: 2017).*

(Continued)

*Primary Examiner* — Kent W Chang
*Assistant Examiner* — Karl Duc Truong
(74) *Attorney, Agent, or Firm* — MORGAN, LEWIS & BOCKIUS LLP

(57)          ABSTRACT

An electronic device includes a memory for storing a first neural network and a second neural network including a plurality of residual blocks and an upscaling block, and a processor for selecting a residual block from among the plurality of residual blocks for an input patch image of a first frame based on the second neural network and generating an output patch image of the first frame by upscaling the input patch image of the first frame to an image having a target resolution based on the selected residual block and the upscaling block.

20 Claims, 5 Drawing Sheets

*600*

First neural network 610

| | | | |
|---|---|---|---|
| Input frame image of first frame 631 | Input patch image of first frame 641 | Residual block 611 | Residual block | ... | Residual block 612 | Up-scaling block | Output patch image of first frame 651 | Output frame image of first frame 661 |

Second neural network 620

| Control network | Control network |
|---|---|
| Control network 621 | Control network |

Fidelity measurement module 670

(51) Int. Cl.

| | | |
|---|---|---|
| *G06N 3/08* | (2023.01) | |
| *G06T 3/18* | (2024.01) | |
| *G06T 3/4007* | (2024.01) | |

(58) Field of Classification Search
CPC .......... G06T 2207/20084; G06N 3/045; G06N 3/08; G06N 3/0464
See application file for complete search history.

(56) References Cited

U.S. PATENT DOCUMENTS

| | | | |
|---|---|---|---|
| 2014/0286586 A1* | 9/2014 | Cheon ................... | H04N 19/50 |
| | | | 382/233 |
| 2018/0302643 A1* | 10/2018 | Mukherjee ........... | H04N 19/107 |
| 2021/0118095 A1* | 4/2021 | Kim ...................... | G06V 10/764 |
| 2021/0174473 A1* | 6/2021 | Lung ......................... | G06T 5/50 |
| 2021/0192688 A1* | 6/2021 | Chih ......................... | G06T 5/70 |
| 2021/0304358 A1* | 9/2021 | Song ..................... | G06T 3/4046 |
| 2021/0390664 A1 | 12/2021 | Pohl et al. | |
| 2023/0153576 A1* | 5/2023 | Li ........................... | G06N 3/045 |
| | | | 706/25 |
| 2023/0297811 A1* | 9/2023 | Yaguchi ................... | G06N 3/08 |
| | | | 706/15 |
| 2023/0368336 A1* | 11/2023 | Datta ........................ | G06T 5/60 |

OTHER PUBLICATIONS

Wu, Zuxuan, et al. "Blockdrop: Dynamic inference paths in residual networks." Proceedings of the IEEE conference on computer vision and pattern recognition. 2018. (Year: 2018).*

Zhang, Yulun, et al. "Residual dense network for image super-resolution." Proceedings of the IEEE conference on computer vision and pattern recognition. 2018. (Year: 2018).*

Habibian, Amirhossein, et al. "Skip-convolutions for efficient video processing." Proceedings of the IEEE/CVF Conference on computer vision and pattern recognition. 2021. (Year: 2021).*

Yeo, Hyunho, et al. "Nemo: enabling neural-enhanced video streaming on commodity mobile devices." Proceedings of the 26th Annual International Conference on Mobile Computing and Networking. 2020. (Year: 2020).*

Wang, Xin, et al. "Skipnet: Learning dynamic routing in convolutional networks." Proceedings of the European conference on computer vision (ECCV). 2018. (Year: 2018).*

Veit, Andreas, and Serge Belongie. "Convolutional networks with adaptive inference graphs." Proceedings of the European conference on computer vision (ECCV). 2018. (Year: 2018).*

Lee, Royson, Stylianos I. Venieris, and Nicholas D. Lane. "Deep neural networkâbased enhancement for image and video streaming systems: A survey and future directions." ACM Computing Surveys (CSUR) 54.8 (2021): 1-30. (Year: 2021).*

Xiao, Lei, et al. "Neural supersampling for real-time rendering." *ACM Transactions on Graphics (TOG)* vol. 39. Issue 4 (2020): 142. pp. 1-12.

Wang, Yifan, et al. "Resolution-Aware Network for Image Super-Resolution." IEEE Transactions on Circuits and Systems for Video Technology 29.5 (2018): 1259-1269.

Liu, Peng, et al, "Single Image Super-Resolution using Adaptive Upsampling Convolutional Network." 2019 IEEE 8th joint international information technology and artificial intelligence conference (ITAIC). IEEE, 2019., (5 pages).

Lee, Juhyoung, et al, "SRNPU: An Energy-Efficient CNN-Based Super-Resolution Processor With Tile-Based Selective Super-Resolution in Mobile Devices." IEEE Journal on Emerging and Selected Topics in Circuits and Systems 10.3 (2020): 320-334.

Park, Karam, et al, "Single Image Super-Resolution with Dynamic Residual Connection." 2020 25th International Conference on Pattern Recognition (ICPR). IEEE, 2021., (8 pages).

Liao, Wenrui, et al. "Residual Attention Block Search for Light-weight Image Super-Resolution." 2021 IEEE International Conference on Multimedia and Expo (ICME). IEEE, 2021., (6 pages).

Ayazoglu, Mustafa. "Extremely Lightweight Quantization Robust Real-Time Single-Image Super Resolution for Mobile Devices." Proceedings of the IEEE/CVF conference on computer vision and pattern recognition. 2021., (8 pages).

Extended European search report issued on Apr. 16, 2024, in counterpart European Patent Application No. 23182974.8 (11 pages).

* cited by examiner

420

APPARATUS AND METHOD WITH IMAGE RESOLUTION UPSCALING

CROSS-REFERENCE TO RELATED APPLICATIONS

This application claims the benefit under 35 USC § 119(a) of Korean Patent Application No. 10-2022-0157630, filed on Nov. 22, 2022, in the Korean Intellectual Property Office, the entire disclosure of which is incorporated herein by reference for all purposes.

BACKGROUND

1. Field

The following description relates to technology for upscaling the resolution of an image.

2. Description of Related Art

Recently, display devices have become available that are capable of displaying images beyond a resolution of ultra-high-definition (UHD) resolution (4K), e.g., up to resolutions of 8K and higher. However, compared to the very high resolutions of newer display devices, existing broadcasting and video content, for example, is often produced in 2K or 4K resolution. Technology for upscaling such image content into higher resolution image content may enable full use of newer UHD displays devices, for example. Image upscaling has many other applications besides upscaling content to "fill" higher resolution displays. For example, upscaling can enable images to be rendered at a low resolution (reducing the cost of rendering) and then upscaled to match an ordinary display. NVIDIA's™ deep learning super sampling (DLSS) technology is an example of image upscaling technology. However, systems for implementing DLSS technology, e.g., PCs, high-end workstations, game consoles, etc., do not suffer from resource constraints such as power consumption. Since the neural network structures required for DLSS technology have many layers and filters, the amount of computation inevitably increases, and thus, they are not generally suitable for implementing on relatively resource-constrained devices such as mobile devices, mobile system on chip (SoC) devices, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: one or more processors; a memory storing a first neural network, a second neural network including residual blocks and an upscaling block, and instructions configured to, when executed by the one or more processors cause the one or more processors to: select a residual block from among the residual blocks to receive an input patch image of a first frame, wherein the selection of the residual block is based on an inference of the second neural network performed on the input patch image, and generate an output patch image of the first frame by upscaling the input patch image of the first frame to a target resolution using the selected residual block and the upscaling block.

The instructions may be further configured to cause the one or more processors to: enable data propagation along a path including a convolution layer of the selected residual block with respect to the selected residual block and propagate output data output based on a result of a convolution operation of the selected residual block and input data of the selected residual block while the input patch image of the first frame is being propagated in the first neural network.

The instructions may be further configured to cause the one or more processors to: disable propagation along a path including a convolution layer of an unselected residual block of the residual blocks and only propagate output data output based on input data of the selected residual block by avoiding performance of a convolution operation by the unselected residual block while the input patch image of the first frame is being propagated in the first neural network.

The second neural network may include control networks each configured for selecting a different respective set of the residual blocks, and wherein one of the control networks may select the residual block.

Each of the control networks may be trained to be capable of outputting output data for selecting residual blocks from among the residual blocks in response to receiving the input patch image and receiving a warped image of the first frame, the warped image may be generated by warping a previously upscaled output frame image of a second frame to the first frame, and the second frame may be previous to the first frame.

Each of the control networks may include a respective output layer, each output layer may include a same number of output nodes that is the same as the number of residual blocks included in the first neural network, and the instructions may be further configured to cause the one or more processors to: in response to one control network among the control networks receiving the input patch image: perform inference by the one control network on the input patch image to generate output values of output nodes of an output layer of the one control network, select the residual block based on an output value of one of the output nodes.

The instructions may be further configured to cause the one or more processors to: train one of the control networks, wherein the one control network is trained in combination with training the first neural network, and calculate a first loss function indicating a difference between a sum of temporary output values of output nodes output the one control network and a set of residual blocks selected by the one control network based on inputting a training input patch image and a training warped image to the one control network, and train the one control network to minimize the calculated first loss function.

The instructions may be further configured to cause the one or more processors to: input the training input patch image to the first neural network, generate a temporary output patch image by applying each of the temporary output values to temporary output data of corresponding residual blocks, calculate a second loss function based on the temporary output patch image and a training output patch image, and train the first neural network to minimize the calculated second loss function.

The instructions may be further configured to cause the one or more processors to: calculate a fidelity patch score of the input patch image of the first frame, and based on the calculated fidelity patch score, select a control network, from among the control networks, to receive the input patch image.

The instructions may be further configured to cause the one or more processors to: generate an interpolated image of the first frame by interpolation-upscaling the input frame image of the first frame to an upscaled image, generate a warped image of the first frame by warping the output frame image of a second frame to the first frame, and calculate the fidelity patch score of the input patch image based on determining a similarity between the interpolated image of the first frame and the warped image of the first frame, wherein the second frame is previous to the first frame.

Score ranges may be respectively associated with the respective control networks, and the instructions may be further configured to cause the one or more processors to: select the control network based on determining that the fidelity patch score is within the score range associated with the selected control network.

In one general aspect, a method of upscaling an input patch image of a first frame includes: accessing a first neural network and a second neural network, the second neural network including residual blocks and an upscaling block; selecting a residual block from among the residual blocks with respect to the input patch image, wherein the selecting is based on the second neural network; and generating an output patch image of the first frame by upscaling the input patch image of the first frame to the output patch image, the output patch image having a target resolution, wherein the upscaling of the input patch image to the output patch image is performed by the selected residual block and the upscaling block.

The generating of the output patch image of the first frame may include enabling data propagation along a path including a convolution layer of the selected residual block and propagating output data output based on a result of a convolution operation of the selected residual block and input data of the selected residual block while the input patch image of the first frame is being propagated in the first neural network.

The generating of the output patch image of the first frame may include disabling data propagation along a path including a convolution layer of an unselected one of the residual blocks by causing the unselected residual block to not perform a convolution operation for the input patch image while the input patch image of the first frame is being propagated in the first neural network.

The second neural network may include control networks each configured to select a respective different set of residual blocks from among the residual blocks.

Each of the control networks may be configured to be capable of outputting data for selecting a residual block from among the residual blocks in response to receiving the input patch image of the first frame and a warped image of the first frame, and the warped image may be an image generated by warping an output frame image of a second frame to the first frame, wherein the second frame is previous to the first frame.

Each of the control networks may include a respective output layer, each output layer may include a same number of output nodes as the number of residual blocks in the first neural network, and the selecting of the residual block may include, in response to one of the control networks receiving the input patch image, selecting the residual block by the one control network based on output values of output nodes output from the output layer of the one control network.

The method may further include calculating a fidelity patch score for the input patch image of the first frame, and selecting a control network, among the control networks, to receive the input patch image, wherein the selecting is based on the calculated fidelity patch score.

The calculating of the fidelity patch score for the input patch image of the first frame may include: generating an interpolated image of the first frame by applying interpolation to the input frame image of the first frame; generating a warped image of the first frame by warping the output frame image of a second frame to the first frame; and calculating the fidelity patch score of the input patch image of the first frame based on a determined similarity between the interpolated image of the first frame and the warped image of the first frame, wherein the second frame is previous to the first frame.

In another general aspect, a method for upscaling an input image is performed by a first neural network and a second neural network, the first neural network including residual blocks and an upscaling block, the second neural network including control networks, and the method includes: generating a fidelity score of an input patch of the input image; selecting a control network, from among the control networks, based on determining that the fidelity score corresponds to the control network; selecting a subset of the residual blocks based on an inference of the selected control network on the input patch; upscaling the input patch by the selected subset of residual blocks and by the upscaling block of the first neural network. Other features and aspects will be apparent from the following detailed description, the drawings, and the claims.

Figures 1, 2:
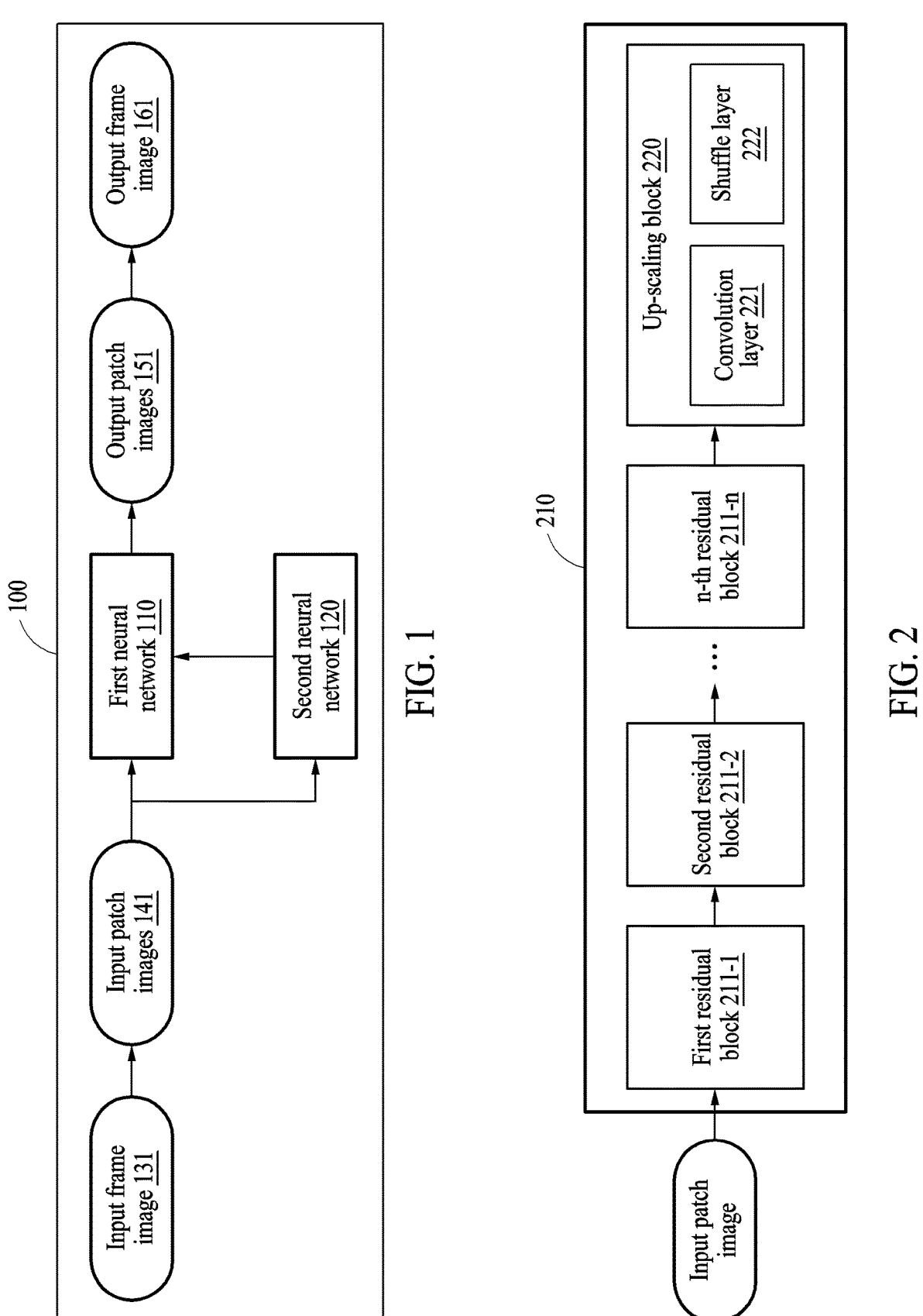
FIG. 1 illustrates an example structure of an electronic device including a first neural network and a second neural network, according to one or more embodiments.
FIG. 2 illustrates example structure of a first neural network, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates example structure of an electronic device including a first neural network and a second neural network, according to one or more embodiments.

An upscaling apparatus (hereinafter referred to generally as an "electronic device") 100 may upscale low-resolution input frame images (e.g., an input frame image 131) to respective high-resolution output frame images (e.g., an output frame image 161). The terms "low" and "high" are used herein for relative comparison and do not imply any particular resolutions.

The electronic device 100 may include a processor, a memory, a communicator and a display. The processor of the electronic device 100 may generate the input frame images, load the input frame images from the memory, or may receive the input frame images from another device (e.g., a server, a cloud service, etc.) via the communicator. The electronic device 100 may upscale input frame images in a frame order (e.g., in an order of frames of a video segment) and output the output frame images, for example, by storing the output frame images for other image processing, by displaying the output frame images on a display, etc.

The memory of the electronic device 100 may store a first neural network 110 and a second neural network 120. The second neural network 120 includes residual blocks and an upscaling block.

Referring to FIG. 1, the processor of the electronic device 100 may divide an input frame image 131 to generate input patch images. The input patch images 141 may have same sizes or different sizes with respect to each other. For example, the input patch images 141 may have various sizes such as 3×3 pixels, 5×5 pixels, 7×7 pixels and 3×5 pixels. For example, the processor of the electronic device 100 may generate the input patch images 141 by dividing the input frame image 131 into partially overlapping image regions. That is two or more input patch images may share a same pixel. That is to say, some of the input patch images 141 may partially share image data of their input frame image 131.

The processor of the electronic device 100 may upscale the input patch images 141 based on the first neural network 110 and the second neural network 120 to generate respective upscaled output patch images 151. The processor of the electronic device 100 may generate an output frame image 161 by merging the output patch images 151. Hereinafter, a process by which the electronic device 100 upscales an input patch image of a first frame based on the first neural network 110 and the second neural network 120 is described in detail. The terms "frame" and "frame image" are used interchangeably herein, and "input" of the term "input frame" may be omitted where the frame is clearly an input frame.

In an example, the processor of the electronic device 100 may (i) select one or more residual blocks from among available residual blocks for upscaling an input patch image of a first frame based on the second neural network 120 and (ii) generate an output patch image by upscaling the input patch image to generate the output patch image to have a target resolution, where the upscaling is performed by the selected residual blocks and an upscaling block (e.g., of the first neural network 110). The target resolution may be obtained by upscaling by a factor of p.

Figure 3:
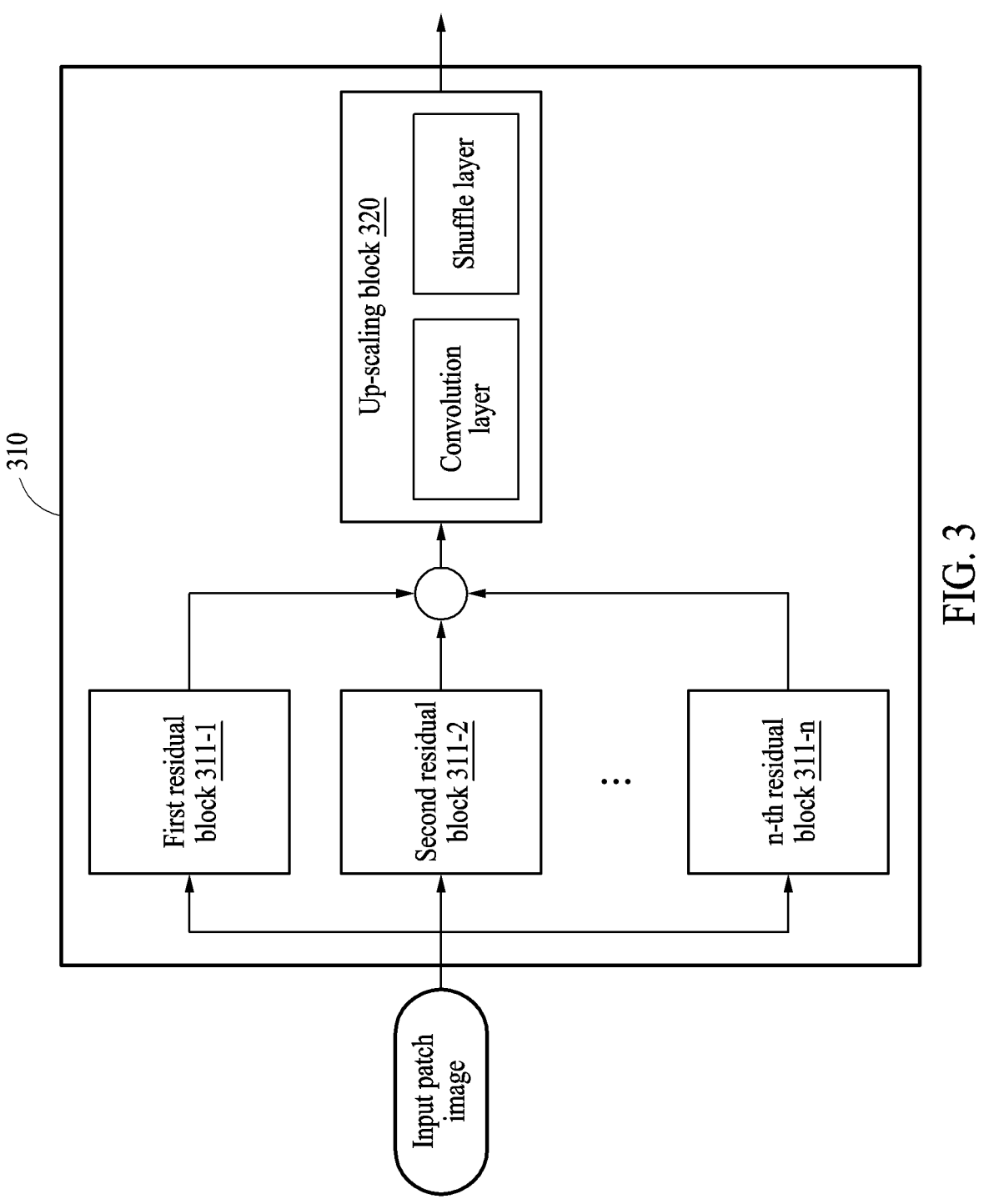
FIG. 3 illustrates example structure of a first neural network, according to one or more embodiments.

FIGS. 2 and 3 illustrate example structure of a first neural network.

A first neural network 210 (e.g., the first neural network 110 of FIG. 1) may include residual blocks (e.g., first residual block 211-1 . . . n-th residual block 211-n) and at least one upscaling block 220. In other words, the first neural network 210 may include n residual blocks, with n greater than "1".

As illustrated in FIG. 2, the residual blocks included in the first neural network 210 may be serially connected to each other so that output data of one residual block may become input data of the next residual block. Referring to FIG. 2, output data of the first residual block 211-1 may be input to the second residual block 211-2, and so forth. Output data of the n-th residual block 211-n may be input to the upscaling block 220.

The residual blocks included in the first neural network 210 are not limited to a serial connection structure. As illustrated in FIG. 3, the residual blocks of a first neural network 310 may be connected in parallel to each other so that the output data of each residual block does not affect the computation of other residual blocks. Referring to FIG. 3, each of the residual blocks 311-1 to 311-n may receive an input patch image as input data. Also, final output data generated by the residual blocks 311-1 to 311-n may be input to an upscaling block 320.

Furthermore, the connection structure of the residual blocks included in the first neural network 210 is not limited to a serial or parallel connection structure and may be implemented in various other connection structures, for example, a structure in which one residual block and other residual blocks connected in parallel are connected in series.

The processor of the electronic device may select one or more residual blocks from among the residual blocks in the first neural network 210 based on the second neural network. The processor of the electronic device may enable (i) propagation of data along a path including a convolution layer of a residual block (selected based on the second neural network) and propagate output data that is based on a result of a convolution operation of the selected residual block upon the input data inputted thereto while (ii) an input patch image of the first frame is propagated in the first neural network 210. The output data outputted from the selected residual block may be the sum of the result of the convolution operation of the residual block and the input data of the residual block, but is not limited thereto. In summary, the processor of the electronic device may perform a convolution operation and a residual operation on one or more residual blocks selected based on the second neural network, and the operations may be performed in pipeline fashion.

A convolution operation as noted above may be performed through a convolution layer included in a residual block, and a residual operation may be performed through a skip connection structure of a residual block. The residual operation may calculate output data (based on a result of a convolution operation calculated) by passing input data through one or more layers included in a residual block and input data.

In an example, the processor of the electronic device may disable propagation along a path (or paths) that includes a convolution layer(s) of unselected residual block(s) and, by thus skipping the convolution operation of the unselected residual block(s), may enable propagation (and generation of output data) for only the selected residual block(s) while an input patch image of the first frame is propagated in (processed by) the first neural network 210. In another approach, an unselected block may be rendered inoperative by passing through any data that is inputted thereto, which may be useful in the case of serial connections between a selected residual block and an unselected residual block. In summary, the processor of the electronic device may not perform (e.g., inhibit, avoid or bypass) a convolution operation and residual operation of any unselected residual blocks.

The number of residual blocks included in the first neural network 210 may bear on the accuracy of an output patch image outputted by the first neural network 210. With fewer residual blocks, the accuracy generally decreases, and with more residual blocks the accuracy (and amount of computation) generally increases, which may make it difficult to reduce the overall weight of the network. Therefore, the number of residual blocks to be included in the first neural network 210 may be determined variably in consideration of the environment to which the first neural network 210 is to be applied.

In an example, the residual blocks (e.g., first residual block 211-1 . . . n-th residual block 211-n) included in the first neural network 210 (whichever are selected) may generate and output an output feature map and transmit it to the upscaling block 220. The upscaling block 220 may upscale the output feature map received from the residual blocks. The upscaling block 220 may include a convolution layer 221 and a shuffle layer 222.

As described above, the target resolution may be obtained by upscaling the resolution of an existing image by a factor of p. In this case, the processor may increase the number of channels of the output feature map output from the residual blocks by $p^2$ through the convolution layer 221 of the upscaling block 220, and may perform upscaling by arranging the pixels included in each of the $p^2$ channels of the output feature map in a feature map upscaled by a factor of p through the shuffle layer 222. For example, when p is "2", the number of channels of the output feature map (output from the residual blocks) may be increased to "4" through the convolution layer 221. For example, the shuffle layer 222 may arrange a pixel at position (1,1) included in a first channel (among the channels of the four output feature maps) as a pixel at position (1,1) of the feature map to be output, arrange a pixel at position (1,1) included in a second channel (among the channels of the four output feature maps) as a pixel at position (1,2) of the feature map to be output, arrange a pixel at position (1,1) included in a third channel (among the channels of the four output feature maps) as a pixel at position (2,1) of the feature map to be output, and arrange a pixel at position (1,1) included in a fourth channel (among the channels of the four output feature maps) as a pixel at position (2,2) of the feature map to be output to perform upscaling. In other words, upscaling may involve distributing pixels at a common pixel position of the output channels to pixel locations in a "super pixel" at a corresponding position of the output feature map (or output image).

Figure 4A:
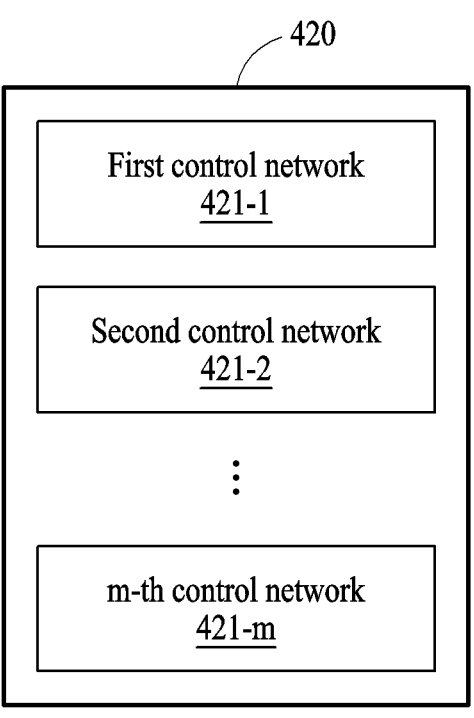
FIG. 4A illustrates example structure of a second neural network, according to one or more embodiments.

FIG. 4A illustrates example structure of a second neural network.

In an example, a second neural network 420 (e.g., the second neural network 120 of FIG. 1) may include control networks (e.g., first control network 421-1 . . . m-th control network 421-m) that are each configured/trained to select different respective sets of residual blocks from among the residual blocks included in the first neural network. The second neural network 420 may include m control networks (m is "2" or more). For example, the first control network 421-1 may select only one residual block from among the residual blocks and the second control network 421-2 may select two residual blocks.

Figure 4B:
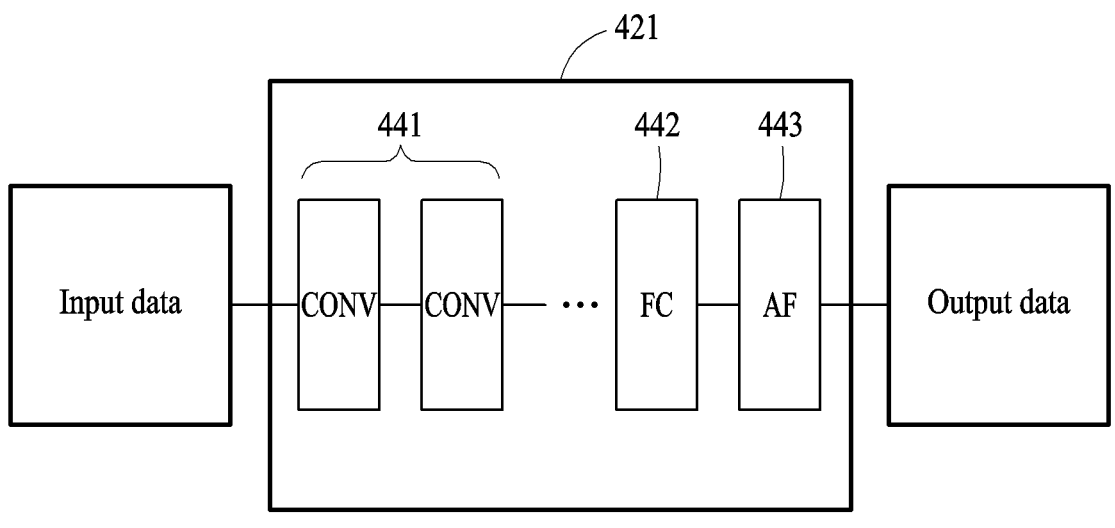
FIG. 4B illustrates example structure of a control network included in a second neural network, according to one or more embodiments.

FIG. 4B illustrates example structure of a control network included in a second neural network.

In FIG. 4B, for convenience of description, the structure of only one target control network 421 is described; the other control networks may have the same structure as the target control network 421 (albeit with different trained parameters, e.g., different weights).

The target control network 421 may be a convolutional neural network (CNN) including convolutional layers 441, a fully-connected layer 442, and an activation function layer 443 (the output layer). The target control network 421 may include additional layers. As noted, the output layer of the target control network 421 may be the activation function layer 443. The activation function layer 443 may be implemented as a sigmoid function, for example, although any suitable activation function may be used. The number of output nodes of the activation function layer 443 may be equal to the number of residual blocks included in the first neural network. In other words, each of the control networks included in the second neural network 420 may include a respective output layer (activation function layer) each having the same number of output nodes as the number of residual blocks included in the first neural network. Put another way, for selection of the residual blocks by the control networks, the control networks may each have a same number of output nodes, and that number of output nodes may correspond to the number of residual blocks, thus allowing a same corresponding output node among the control networks to independently control/select a same residual block.

When the processor of the electronic device inputs an input patch image of the first frame to the target control network 421, a residual block selected by the target control network 421 from among the plurality of residual blocks included in the first neural network may be determined based on the inferred output values of the output nodes output from the output layer (e.g., the activation function layer 443) of the target control network 421.

More specifically, the processor of the electronic device may match each of the output nodes of the output layer of the target control network 421 with the respective residual blocks included in the first neural network. For example, when an order is assigned to each of the residual blocks, the processor of the electronic device may match a k-th output node of the output layer of the target control network 421 with a k-th residual block included in the first neural network. When an output value of the k-th output node of the output layer of the target control network 421 is greater than or equal to a threshold value, the processor may determine that the target control network 421 has selected the k-th residual block included in the first neural network. When an output value of the k-th output node of the output layer of the target control network 421 is less than a threshold value, the processor may determine that the target control network 421 has not selected the k-th residual block included in the first neural network. For example, the threshold value may be "0.8", but is not limited thereto. Such decision making may be performed for each of the output nodes of the target control network 421.

In an example, the input patch image of the first frame and a warped image of the first frame (the warped image being an image warped to the first frame from an output frame image of a second frame) may be input to the target control network 421. The second frame may be previous to the first frame. For example, when the first frame is the i-th frame, the second frame is the i−1-th frame. The target control network 421 may be trained to output data for a selected residual block in response to receiving the input patch image of the first frame and the warped image of the first frame.

The processor of the electronic device may upscale input frame images in an order of the frames. Therefore, at the time of upscaling the input frame image of the first frame (e.g., the i-th frame), the processor of the electronic device may be in a state in which upscaling has been completed for an input frame image of the second frame (e.g., the i−1-th frame). Accordingly, the processor may load an output frame image HR(i−1) ("HR" meaning "high resolution") of the second frame (e.g., the i−1-th frame) that has been obtained by previously upscaling an input frame image LR(i−1) ("LR" meaning "low resolution") of the second frame (e.g., the i−1-th frame) based on the first neural network and the second neural network. The warped image of the first frame may be generated by warping the output frame image HR(i−1) of the second frame to the first frame using a motion vector map, the motion vector map being a map of motion vectors where each motion vector represents the predicted size and direction of movement of (i) a respective pixel that makes up the input frame image of the previous frame to (ii) the corresponding pixel in the input frame image of the next frame. The processor of the electronic device may generate the warped image of the first frame based on applying the motion vector map (from the second frame) to the first frame with respect to the output frame image HR(i−1) of the second frame.

The processor of the electronic device may train each of the control networks included in the second neural network. One control network and the first neural network may be trained together. The set of residual blocks to be selected by each of the respective control networks may be preset. Hereinafter, a process of training the target control network 421 (which is set to select k number of residual blocks) is described, with k being greater than or equal to "1".

In an example, the processor of the electronic device may train the first neural network and the target control network 421 together. The processor of the electronic device may input a training input patch image to the first neural network and input a training input patch image and a training warped image to the target control network 421. The processor of the electronic device may generate temporary output data for temporary output values of the output nodes that make up the output layer of the target control network 421. The temporary output data may be generated (inferred) based on inputting the training input patch image and the training warped image to the target control network 421.

The processor of the electronic device may calculate a first loss function indicating a difference between (i) a sum of the temporary output values of the output nodes output from the target control network 421 and (ii) the number k of residual blocks selected by the target control network 421, and may do so based on inputting the training input patch image and the training warped image to the target control network 421. The processor of the electronic device may train the target control network 421 to minimize the calculated first loss function. The first loss function may be expressed by Equation 1.

$$L_{control\ network} = \left| \sum_{j=1}^{n} G_j(\text{Patch\_LR}(i), \text{Warping}(i)) - k \right| \qquad \text{Equation 1}$$

In Equation 1, $L_{control\ network}$ denotes the first loss function applied to the target control network 421, n denotes the number of output nodes of the output layer of the target control network 421, $G_j(\bullet)$ denotes a temporary output value of a j-th output node of the output layer included in the target control network 421, Patch_LR(i) denotes a training input patch image of an i-th frame, Warping(i) denotes a training warped image of the i-th frame, and k denotes the number of residual blocks selected by the target control network 421.

In addition, the processor may input the training input patch image to the first neural network and apply each of the temporary output values of the output nodes (as output from the target control network 421) to temporary output data of a corresponding residual block to generate a temporary output patch image. For example, a temporary output patch image may be generated by multiplying each of the temporary output values of the output nodes output from the target control network 421 with the temporary output data of the corresponding residual block. The processor of the electronic device may calculate a second loss function based on the generated temporary output patch image and the training output patch image and then train the first neural network to minimize the calculated second loss function.

In an example, the processor of the electronic device may divide an input frame image of the first frame into input patch images of the first frame and input each of the input patch images of the first frame to the same control network to generate output patch images of the first frame.

Figure 5:
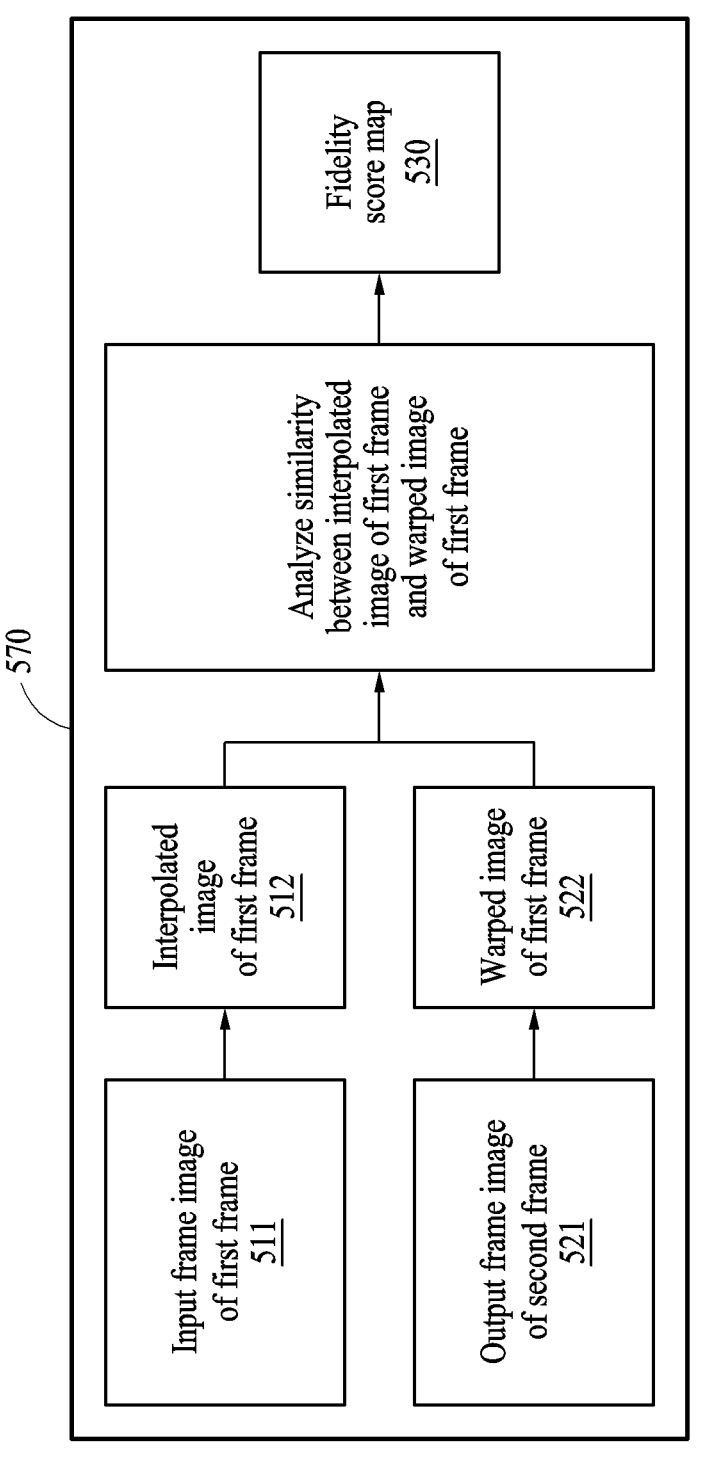
FIG. 5 illustrates example structure of a fidelity measurement module, according to one or more embodiments.

In another example, the processor of the electronic device may individually input each of the input patch images of the first frame to the same or different control network to individually generate output patch images. FIG. 5 describes a method in which a processor of an electronic device determines which control network an input patch image of a first frame is to be input to.

FIG. 5 illustrates example structure of a fidelity measurement module.

The electronic device may further include a fidelity measurement module 570 that calculates a fidelity patch score for an input patch image of the first frame. In an example, the processor of the electronic device may select a control network to which an input patch image of the first frame is to be input from among control networks included in the second neural network based on a fidelity patch score for the input patch image calculated by the fidelity measurement module 570. The processor of the electronic device may activate the selected control network and inactivate (or disregard, bypass, etc.) the control networks that are not selected. To compute the fidelity patch score for the input patch image, the electronic device may first generate a fidelity score map 530 of the first frame, as described next.

The fidelity measurement module 570 may calculate a fidelity pixel score of each of the pixels that make up the input frame image of the first frame (e.g., the i-th frame). The fidelity measurement module 570 may load both an input frame image 511 LR(i) of the first frame and an output frame image 521 HR(i−1) of the second frame (e.g., the i−1-th frame), which is previous to the first frame.

The fidelity measurement module 570 may generate an interpolated image 512 of the first frame (an image upscaled by interpolation) by applying bilinear interpolation to the input frame image 511 LR(i) of the first frame. The fidelity measurement module 570 may generate a warped image 522 of the first frame by warping the output frame image 521 HR(i−1) of the second frame to the first frame. As described above, the warped image 522 of the first frame may be generated by applying the motion vector map (of motion from the second frame to the first frame) to the output frame image 521 HR(i−1) of the second frame.

The fidelity measurement module 570 may calculate a fidelity patch score of the input patch image of the first frame based on determining a similarity between the interpolated image 512 of the first frame and the warped image 522 of the first frame.

More comprehensively, the fidelity measurement module 570 may determine a similarity between the interpolated image 512 of the first frame and the warped image 522 of the first frame for each pixel of the interpolated image (or the warped image 522, which have same dimensions). The fidelity measurement module 570 may determine a similarity score between a first pixel in the interpolated image 512 of the first frame and a second pixel at a position in the warped image 522 corresponding to the position of the first pixel in the warped image 522. Here, the first and second pixels are representative of all of the pixels; the similarity analysis/determination (description of which continues below) may be performed for each pixel of the interpolated image 512. The fidelity measurement module 570 may determine a similarity between pixels based on structural similarity (SSIM) or peak signal-to-noise ratio (PSNR), but other methods of determining the similarity may be used.

For example, the fidelity measurement module 570 may select a first image region in the interpolated image centered on the first pixel and select a second image region in the warped image 522 centered on the second pixel. In this example, the first image region and the second image region may be image regions disposed at positions corresponding to each other (same image positions), and thus, the sizes of the first and second image regions may be equal to each other. The fidelity measurement module 570 may determine a similarity score between the first and second image regions to calculate the fidelity pixel score of the first pixel (or second pixel) and store the similarity score in a fidelity score map 530. As noted, the similarity scoring may be performed for each pixel. The number of pixels included in the fidelity score map 530 may be the same as the number of pixels included in the output/interpolated frame image. When a similarity score between the first and second image regions is greater than or equal to a threshold similarity, the fidelity measurement module 570 may set the fidelity pixel score of a pixel (in the fidelity score map 53) at a position corresponding to the first pixel (or second pixel) in the fidelity score map 530 to be "1". When a similarity score between the image region and the other image region is less than the threshold similarity, the fidelity measurement module 570 may set the fidelity pixel score to be "0".

As described above, the fidelity measurement module 570 may calculate the fidelity pixel scores and store them in the respective pixels of the fidelity score map 530 (the fidelity pixel scores corresponding to the input frame image 511 LR(i) of the first frame). The fidelity measurement module 570 may calculate the above-mentioned fidelity patch score of the input patch image of the first frame based on the fidelity score map 530. For example, The fidelity pixel scores corresponding to the pixels of the input patch image may be extracted from the fidelity score map 530 and the fidelity patch score of the input patch image may be calculated as an average value of the extracted fidelity pixel scores. However, other methods may be used to calculate the fidelity patch score of the input patch image, for example, other statistical computations such as a weighted average or distribution, a median, etc. may be used.

In an example, score ranges (of fidelity patch scores) may be associated with the control networks, respectively. The processor of the electronic device may determine which score range contains the fidelity patch score calculated for the input patch image and select the control network associated with that score range as the control network to which the input patch image is to be inputted. In an example, the fidelity measurement module 570 may calculate fidelity patch scores for each of the input patch images of the first frame, respectively, and accordingly, the control networks to which the input patch images are inputted may vary according to the fidelities of the patch images. In other words, the processor of the electronic device may individually select a control network to receive an input patch image for each of the input patch images of the first frame.

In the following example, it is assumed that the second neural network includes a first control network, a second control network, and a third control network. A score range associated with the first control network may range from zero to a first threshold score (e.g., "0" to "0.3"), a second score range associated with the second control network may range from the first threshold score to a second threshold score (e.g., "0.3" to "0.7"), and a third score range associated with the third control network may range from the second threshold score to one (e.g., "0.7" to "1"). When the fidelity patch score of an input patch image of the first frame (as calculated by the fidelity measurement module 570) is determined to be within the first range, the processor of the electronic device may select the first control network (based on its association with the determined first range) to receive the input patch image. In this case, the processor of the electronic device may activate the selected first control network (selected from among the control networks in the second neural network) and deactivate (disregard, disconnect, bypass, etc.) the remaining unselected control networks, and input the input patch image of the first frame to the selected first control network.

Figure 6:
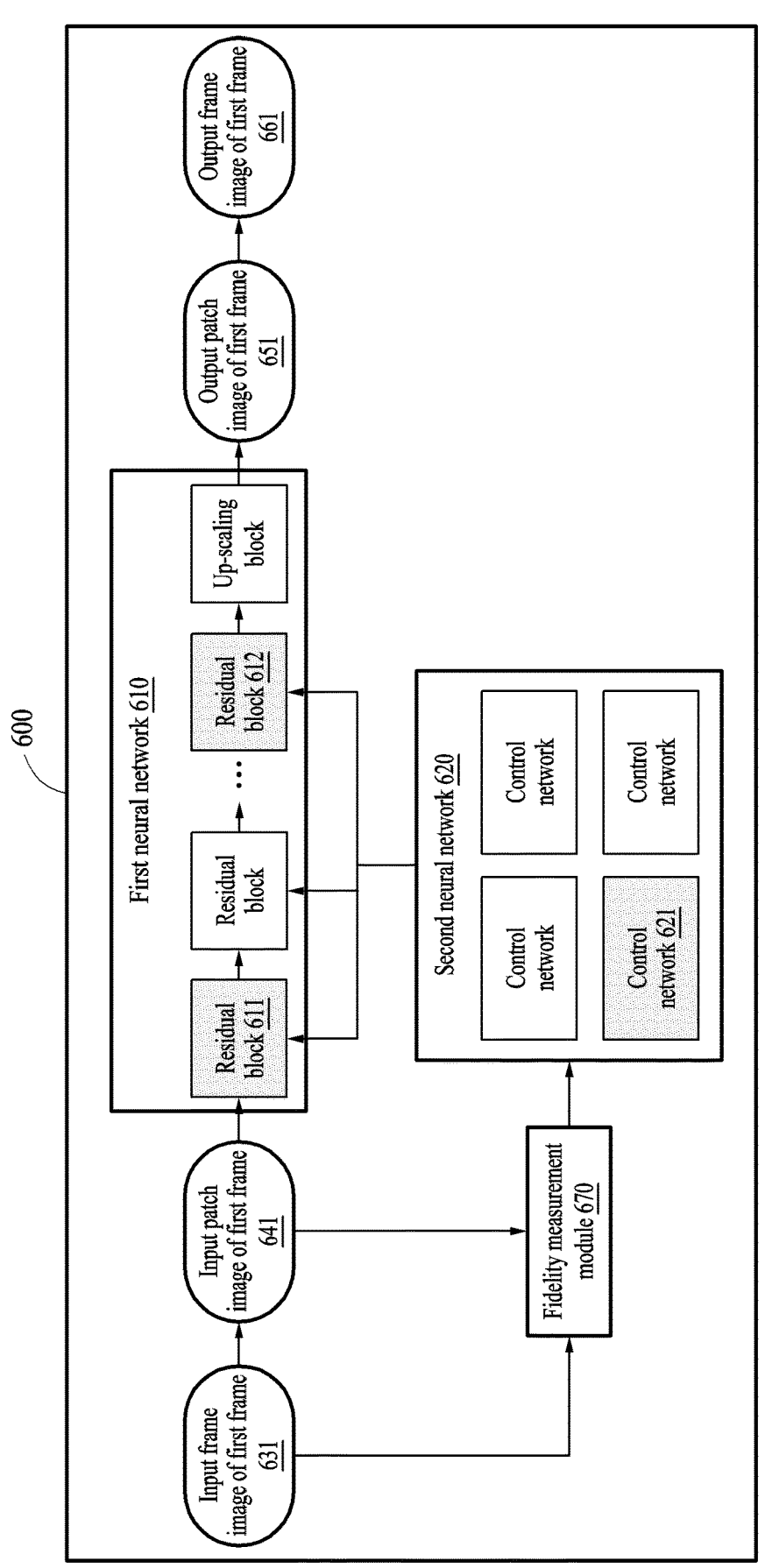
FIG. 6 illustrates example structure of an electronic device including a fidelity measurement module, according to one or more embodiments.

FIG. 6 illustrates example structure of an electronic device including a fidelity measurement module. Shaded blocks in FIG. 6 indicate components activated/selected based on an input patch image 641.

A processor of an electronic device 600 may generate an output frame image 661 of the first frame by upscaling one input frame image 631 of the first frame (the output frame image being an upscaled version of the input frame image 631). The processor of the electronic device 600 may generate input patch images of the first frame by dividing the input frame image 631 and by upscaling each of the input patch images of the first frame using a first neural network 610, a second neural network 620, and a fidelity measurement module 670. Hereinafter, an upscaling process of only one input patch image 641 of the first frame is described, which is representative of upscaling each of the input patch images of the first frame.

The fidelity measurement module 670 included in the electronic device 600 may use the input frame image 631 of the first frame and the input patch image 641 of the first frame to calculate a fidelity patch score for the input patch image 641. The processor of the electronic device 600 may select one control network 621 to receive the input patch image 641 from among the control networks in the second neural network 620 and may make the selection based on the fidelity patch score of the input patch image 641 of the first frame. The processor of the electronic device 600 may activate/use only the selected control network 621 and inactivate (or otherwise not use) the remaining control networks in the second neural network 620. The processor of the electronic device 600 may input the input patch image 641 to the activated control network 621 and, based on output thereof, select one or more residual blocks (e.g., a residual block 611 and a residual block 612) from among the residual blocks included in the first neural network 610. The processor of the electronic device 600 may enable data propagation along a path (or paths) including a convolutional layer(s) for the selected residual blocks (e.g., the residual block 611 and the residual block 612) and disable data propagation along a path (or paths) including the convolutional layer(s) for the unselected residual blocks. The processor of the electronic device 600 may generate an output patch image 651 of the first frame upscaled to a target image resolution by inputting the input patch image 641 of the first frame to the first neural network 610. According to the above-described method, the processor of the electronic device 600 may generate output patch images of the first frame by upscaling the respective input patch images of the first frame. The generated output patch images may be merged to generate an output frame image 661 of the first frame. The overall upscaling process may be repeated for a next frame, thereby allowing a video stream to be upscaled.

The upscaling techniques described herein may be applied in real-time to streaming video, may be applied in an off-line setting, may be applied to low-resolution synthetic images (e.g., images rendered from a 3D model), may be applied to low-resolution camera-captured images, and so forth. The upscaling may be performed for a set of related images that are not necessarily part of a same video sequence to upscale individual images. Upscaled images/frames may be displayed, stored, used for other image/video processing and any of the other many applications for images/frames (e.g., object recognition/detection).

The computing apparatuses, the electronic devices, the processors, the memories, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device, comprising:
   one or more processors;
   a memory storing instructions configured to, when executed by one or more processors, cause the one or more processors to:
   implement a first neural network comprising residual blocks and an upscaling block, and configured to receive input patch images of a first frame and output upscaled output patch images,
   implement a second neural network comprising control networks and configured to receive input patch images of the first frame and output a selection of a residual block from among the residual blocks of the first neural network to receive an input patch image of the first frame, the selection being based on an inference performed on the input patch image and a warped image generated by warping a previously upscaled output frame image of a second frame to the first frame using a motion vector, and
   generate an output patch image of the first frame by upscaling the input patch image of the first frame to a target resolution using the selected residual block and the upscaling block.

2. The electronic device of claim 1, wherein the instructions are further configured to cause the one or more processors to:

enable data propagation along a path comprising a convolution layer of the selected residual block with respect to the selected residual block and propagate output data output based on a result of a convolution operation of the selected residual block and input data of the selected residual block while the input patch image of the first frame is being propagated in the first neural network.

3. The electronic device of claim 1, wherein the instructions are further configured to cause the one or more processors to:

disable propagation along a path comprising a convolution layer of an unselected residual block of the residual blocks and only propagate output data output based on input data of the selected residual block by avoiding performance of a convolution operation by the unselected residual block while the input patch image of the first frame is being propagated in the first neural network.

4. The electronic device of claim 1, wherein the control networks of the second neural network are each configured for selecting a different respective set of the residual blocks, and wherein one of the control networks selects the residual block.

5. The electronic device of claim 4, wherein each of the control networks are trained to be capable of outputting output data for selecting residual blocks from among the residual blocks of the first neural network in response to receiving the input patch image and receiving the warped image, wherein the warped image is generated by warping a previously upscaled output frame image of the second frame to the first frame, and wherein the second frame is previous to the first frame.

6. The electronic device of claim 4, wherein each of the control networks comprises a respective output layer, wherein each output layer comprises a same number of output nodes that is the same as the number of residual blocks comprised in the first neural network, and wherein the instructions are further configured to cause the one or more processors to:

in response to one control network among the control networks receiving the input patch image:

perform inference by the one control network on the input patch image to generate output values of output nodes of an output layer of the one control network, select the residual block based on an output value of one of the output nodes.

7. The electronic device of claim 4, wherein the instructions are further configured to cause the one or more processors to:

train one of the control networks, wherein the one control network is trained in combination with training the first neural network, and calculate a first loss function indicating a difference between a sum of temporary output values of output nodes output the one control network and a set of residual blocks selected by the one control network based on inputting a training input patch image and a training warped image to the one control network, and train the one control network to minimize the calculated first loss function.

8. The electronic device of claim 7, wherein the instructions are further configured to cause the one or more processors to:

input the training input patch image to the first neural network, generate a temporary output patch image by applying each of the temporary output values to temporary output data of corresponding residual blocks, calculate a second loss function based on the temporary output patch image and a training output patch image, and train the first neural network to minimize the calculated second loss function.

9. The electronic device of claim 4, wherein the instructions are further configured to cause the one or more processors to:

calculate a fidelity patch score of the input patch image of the first frame, and based on the calculated fidelity patch score, select a control network, from among the control networks, to receive the input patch image.

10. The electronic device of claim 9, wherein the instructions are further configured to cause the one or more processors to:

generate an interpolated image of the first frame by interpolation-upscaling the input frame image of the first frame to an upscaled image, generate the warped image by warping the output frame image of the second frame to the first frame, and calculate the fidelity patch score of the input patch image based on determining a similarity between the interpolated image of the first frame and the warped image, wherein the second frame is previous to the first frame.

11. The electronic device of claim 9, wherein score ranges are respectively associated with the respective control networks, and wherein the instructions are further configured to cause the one or more processors to:

select the control network based on determining that the fidelity patch score is within the score range associated with the selected control network.

12. A method of upscaling an input patch image of a first frame, the method comprising:

inputting the input patch image of the first frame to a first neural network and a second neural network, the first neural network comprising residual blocks and an upscaling block, the second neural network comprising control networks;

selecting a residual block from among the residual blocks of the first neural network with respect to the input patch image, wherein the selecting is based on an output of the second neural network generated based on a warped image generated by warping a previously upscaled output frame image of a second frame to the first frame using a motion vector; and generating an output patch image of the first frame by upscaling the input patch image of the first frame to the output patch image, the output patch image having a target resolution, wherein the upscaling of the input patch image to the output patch image is performed by the selected residual block and the upscaling block.

13. The method of claim 12, wherein the generating of the output patch image of the first frame comprises:

enabling data propagation along a path comprising a convolution layer of the selected residual block and propagating output data output based on a result of a convolution operation of the selected residual block and input data of the selected residual block while the input patch image of the first frame is being propagated in the first neural network.

14. The method of claim 12, wherein the generating of the output patch image of the first frame comprises:

disabling data propagation along a path comprising a convolution layer of an unselected one of the residual blocks by causing the unselected residual block to not perform a convolution operation for the input patch image while the input patch image of the first frame is being propagated in the first neural network.

15. The method of claim 12, wherein the control networks are each configured to select a respective different set of residual blocks from among the residual blocks.

16. The method of claim 15, wherein each of the control networks are configured to be capable of outputting data for selecting a residual block from among the residual blocks of the first neural network in response to receiving the input patch image of the first frame and the warped image, wherein the warped image is an image generated by warping an output frame image of the second frame to the first frame, wherein the second frame is previous to the first frame.

17. The method of claim 15, wherein each of the control networks comprises a respective output layer, wherein each output layer comprises a same number of output nodes as the number of residual blocks in the first neural network, and wherein the selecting of the residual block comprises, in response to one of the control networks receiving the input patch image, selecting the residual block by the one control network based on output values of output nodes output from the output layer of the one control network.

18. The method of claim 15, further comprising:

calculating a fidelity patch score for the input patch image of the first frame; and selecting a control network, among the control networks, to receive the input patch image, wherein the selecting is based on the calculated fidelity patch score.

19. The method of claim 18, wherein the calculating of the fidelity patch score for the input patch image of the first frame comprises:

generating an interpolated image of the first frame by applying interpolation to the input frame image of the first frame;

generating the warped image by warping the output frame image of the second frame to the first frame; and calculating the fidelity patch score of the input patch image of the first frame based on a determined similarity between the interpolated image of the first frame and the warped image, wherein the second frame is previous to the first frame.

20. A method for upscaling an input image, the method performed by a first neural network and a second neural network, the first neural network comprising residual blocks and an upscaling block, the second neural network comprising control networks, the method comprising:

generating a fidelity score of an input patch of the input image and a warped image generated by warping a previously upscaled output frame image of a second frame to a first frame using a motion vector;

selecting a control network, from among the control networks of the second neural network, based on determining that the fidelity score corresponds to the control network;

selecting a subset of the residual blocks of the first neural network based on an inference of the selected control network on the input patch;

upscaling the input patch by the selected subset of residual blocks and by the upscaling block of the first neural network.

* * * * *